INVENTOR.
FREDRICK W. OSBORN
BY
ATTORNEYS

United States Patent Office 3,435,317
Patented Mar. 25, 1969

3,435,317
DIFFERENTIAL OUTPUT CIRCUIT FOR CAPACITIVE PICKOFFS AND THE LIKE
Fredrick W. Osborn, Rockford, Mich., assignor to Lear Siegler, Inc.
Filed May 5, 1965, Ser. No. 453,420
Int. Cl. H02j; G01r 1/00; G08c
U.S. Cl. 320—1                                 8 Claims

ABSTRACT OF THE DISCLOSURE

The present invention relates generally to capacitive pickoff circuits and more particularly to a capacitive pickoff circuit wherein the output is a DC voltage which is proportional to the displacement of the AC excited pickoff.

---

This invention relates generally to the precise measurement of reactance or impedance changes, and more particularly to a circuit for providing an output directly representative of the relative capacitance of capacitive pickoff means such as are used in gyroscopes and the like, including the instantaneous changes thereof effected by relative pickoff displacements.

Capacitive pickoffs are of course well known, and have several very desirable advantages, including an inherently low reaction torque exerted against the gyroscope rotor, and very high sensitivity. In the past, such pickoffs were used mainly in one of two ways. In the first of these, the capacitance was used as a tuning element in an oscillator circuit, and the change in capacitance representative of a change in the relative position between two members was measured by the change in the frequency of the oscillator. The other way of utilizing these pickoffs was to incorporate them in a bridge circuit which was energized by an alternating current. The changes in capacitance would unbalance the bridge and hence they could be measured by the current flow caused thereby.

In most such applications, additional components and circuitry must be used to convert the AC output signals into useable DC signals which are proportional to the position change represented by the pickoff displacement. Most often, an AC isolation amplifier is provided which is used to drive some sort of demodulation device, synchronous rectifier, or the like, which generates the desired DC output. Such external circuitry seems to inevitably introduce undesirable sources of error, particularly through circuit capacitance changes which cause drift and null offset errors. Since the changes in capacitance which are desired to be measured are very small, it will be appreciated that it is practically impossible for external or remote circuitry to not introduce spurious capacitance changes, which may be due only to such factors as temperature changes upon transformer windings, or the effect of tiny physical movements in the conductors used in the various circuit branches.

Further, previous arrangements for utilizing capacitive pickoffs generally required the use of at least one transformer in the associated circuitry. In addition to the interwinding capacitance and the problems presented thereby, the presence of transformers has made the miniaturization of these circuits extremely difficult and in most cases impossible. Also, since most preferred implementations of capacitive pickoffs utilize relatively high excitation frequencies, the use of transformers introduces an added problem in maintaining proper phase relationships throughout the circuitry, particularly the phase relationships which are required by many demodulation devices. As a consequence of all of these difficulties, the desirable attributes of capacitive pickoffs have for the most part been overbalanced, and the use of these pickoffs has been precluded in many applications where it would otherwise be extremely desirable.

Accordingly, it is a major objective of the present invention to provide a circuit for directly producing a DC output that is proportional to the capacitance changes brought about by pickoff displacement. Further, the present inventive circuit minimizes the introduction of stray capacitance or other reactance, thereby greatly reducing undesired null shifts and pickoff sensitivity degeneration.

Another important object of the present invention is to provide an output circuit for capacitive pickoffs having the nature described, with reduced sensitivity to excitation frequency variations and which requires no phase discrimination circuitry or synchronous demodulator circuitry, which further requires no transformers, and which consequently is readily miniaturized in accordance with preferred present-day techniques.

A further object of the present invention is to provide a dual pickoff output circuit having all of the foregoing desired and preferred attributes, and which provides a pair of different direct voltage outputs having a predetermined relationship to pickoff displacements.

A still further object of the present invention is to provide a dual pickoff output circuit of the nature described which further includes a differential circuit branch having a single direct voltage output whose polarity and magnitude has a predetermined relationship to pickoff displacements.

The foregoing important objects and advantages of the present invention, together with other equally desirable features and attributes thereof, will become increasingly apparent to those skilled in the art to which the invention pertains following consideration of the ensuing specification and its appended claims, particularly when taken in connection with the accompanying illustrative drawings setting forth preferred embodiments thereof.

Briefly stated, the present invention provides an output circuit for producing a direct voltage output that is representative of the displacement and capacitance changes of a capacitive pickoff means. The output circuit includes a pair of symmetrical charge paths, each for connection with one of the lateral pickoff electrodes or plates. The charge paths each include a diode or the like for rectifying the current flowing in that path, and also an impedance element for generating an output voltage representative of the rectified current. The output circuit also includes a pair of symmetrical discharge paths which are each for connection with one of the same said lateral pickoff electrodes, each of the discharge paths including a current-conductive component for discharging the particular pickoff electrode to which that path is connected. Further, the circuit preferably includes a differential circuit branch connecting the two output voltage-generating impedance elements across a common load component, such that the two output voltages oppose each other. The differential branch thus provides at its load a differential voltage output representative of the difference between the two output voltages generated in the pair of charge paths, and consequently also representative of the displacement of the pickoff means.

Figure 1:
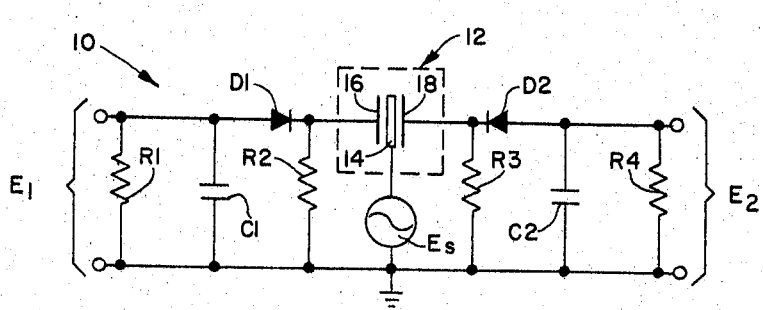
FIG. 1 is a schematic circuit diagram illustrating a first embodiment of the present output circuit.

Referring now in more detail to the drawings, the basic output circuit 10 is illustrated in the schematic drawing of FIG. 1. Here, as in each of the three figures, the capacitive pickoff means is designated generally 12. As is well known, such a pickoff means is basically a ganged capacitor formed by a central or common electrode or plate 14 and a pair of lateral electrodes or plates which are designated 16 and 18. Generally, the lateral plates are fixedly mounted, whereas the central plate is rotatably or otherwise movably mounted for position displacements which effect corresponding changes in the relative capacitance between the different plates in the device. As is illustrated, the central or common plate 14 is excited by a source of alternating potential $E(s)$, connected between that plate and the circuit ground.

The output circuit 10 of FIG. 1 is seen to include a pair of symmetrical charge paths which are connected to the lateral pickoff electrodes 16 and 18, respectively. The first charge path includes what may be termed a series-connected resistance element R1 and a rectifying means, preferably a diode, D1, and the second charge path includes a series-connected resistance element R4 and rectifying diode D2. Each of the resistance elements R1 and R4 are shunted by a capacitor C1 and C2, respectively, which serves to smooth the wave-shape of voltages developed across the respective resistance elements. The output circuit 10 further includes a pair of discharge paths for the pickoff means 12. These are provided in this circuit configuration by the resistance elements R2 and R3, which are connected to pickoff electrodes 16 and 18, respectively, between the electrode and the charge path rectifying means D1 and D2. As will be apparent, the discharge paths provided by resistance elements R2 and R3 provide a path for discharging the respective pickoff electrodes to the circuit ground connection.

In operation, the output circuit 10 of FIG. 1 provides a path for charging the plates of the pickoff means 12 on one portion of a cycle of the potential from the source $E(s)$. This is accomplished in one instance by a current flowing through resistor R1 and diode D1, and in the other instance by current flowing through resistance R4 and diode D2. As this current flows for the cycle time determined by the source $E(s)$, it develops a pair of corresponding voltages $E(1)$ and $E(2)$ across resistors R1 and R4, respectively. The current flow through the charge paths, and the voltages developed in consequence thereof, are thus clearly representative of the particular condition of relative pickoff capacitance existing at that instant of time. As has been stated, capacitor C1 and C2 serve to filter or smooth the wave-forms of voltages $E(1)$ and $E(2)$, respectively. When the energizing potential of source $E(s)$ goes into the next portion of its cycle, the charge accumulated upon the plates of the pickoff means is blocked by the rectifying action of diodes D1 and D2, and consequently there is no corresponding cycle of voltage developed across resistors R1 and R4. Instead, the charge built up upon the pickoff plates is discharged through the discharge paths afforded by resistors R2 and R3, respectively. As the alternations of the exciting potential from source $E(s)$ continue, it will be apparent that the outputs $E(1)$ and $E(2)$ are filtered, pulsating direct voltages whose values are directly representative of the relative pickoff displacements.

Figure 2:
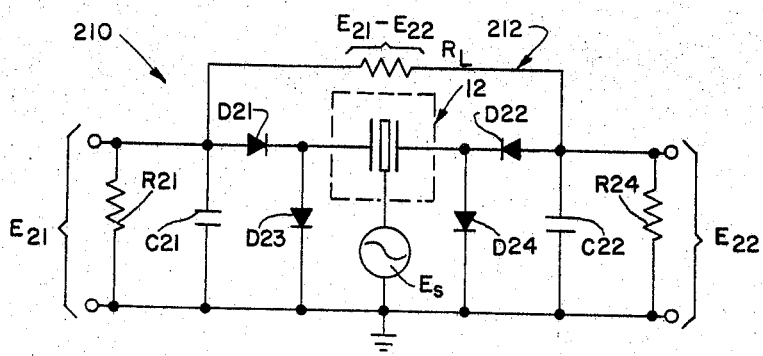
FIG. 2 is a schematic circuit diagram illustrating a second embodiment of the novel circuit.

The output circuit 210 shown in FIG. 2 is basically the same as circuit 10 of FIG. 1, and corresponding elements have corresponding designations prefixed by the numeral "2." However, it will be observed that resistors R2 and R3 forming the discharge paths of the circuit 10 have been omitted, and that a pair of diodes or other rectifying means D23 and D24, respectively, have been substituted therefore. Further, it will be noted that the connection of diodes D23 and D24 to the pickoff means 12 is in a manner inverse to that of the connection of diodes D21 and D22 in the charge paths. That is, the anode of the diode in one path is connected to the lateral pickoff plate, whereas the cathode of the diode in the other path is connected to this plate. This of course causes the diodes in the charge and discharge paths to operate in a mutually exclusive manner, on different portions of a cycle of the excitation source potential. The purpose of substituting diodes D23 and D24 for resistors R2 and R3 of FIG. 1 is to further reduce the loading of the pickoff, and to provide even greater sensitivity for the output circuit 210.

Output circuit 210 of FIG. 2 is further changed from circuit 10 in FIG. 1 by the addition in the former of a differential circuit branch 212. As the figure illustrates, this branch includes a common load element typified by resistor $R(L)$, which interconnects the output voltage-generating resistors R21 and R24 to couple output voltages E21 and E22 in an opposing fashion across the load element $R(L)$. As will be apparent in connection with each of the three circuits shown and described herein, if it is assumed that the characteristics of the charge path diodes are substantially identical, and if the charge path voltage-developing resistors such as R21 and R24 are chosen to be identical, then the difference between the output voltages developed thereby such as E21 and E22 and the like will be a function of the relative capacitance of the pickoff means 12. Thus, the differential voltage appearing across load element $R(L)$ will be completely representative of the difference in magnitudes between the charge path output voltages, and consequently, completely representative of the displacement condition then existing at the pickoff means.

Figure 3:
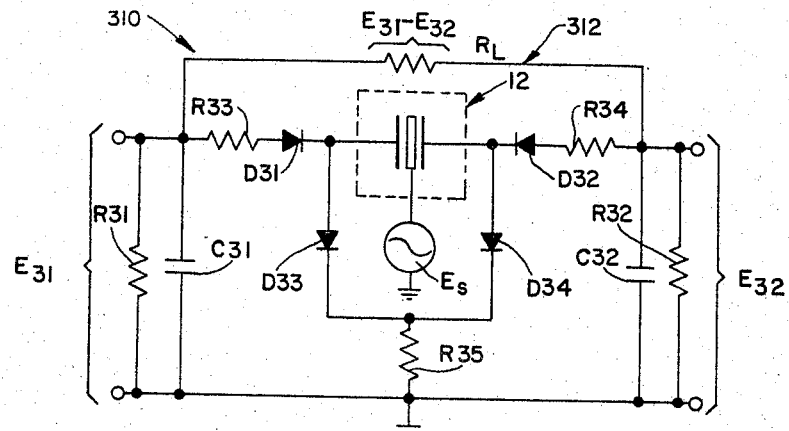
FIG. 3 is a schematic circuit diagram illustrating a third embodiment of the circuit.

Output circuit 310 illustrated in the schematic of FIG. 3 is a further embodiment of the teachings involved in FIGS. 1 and 2, and its several components are similarly designated by the inclusion of the prefix numeral "3." It will be observed, however, that the symmetrical charge paths of circuit 310 include an added series resistor R33 and R34, respectively. Also, the discharge paths provided by diodes D33 and D34 are coupled together and connected to ground through an added resistor R35. Other than for these elements, output circuit 310 is essentially the same as circuit 210 of FIG. 2, including a differential branch 312. The operation of circuit 310 is substantially the same as circuit 210, except for the refinements provided by added resistors R33, R34, and R35, which serve to suppress any ringing in the circuit due to switching transients generated in the respective diode rectifying means. Although not intimately connected with the inventive concept here involved, it is to be noted that by matching filter capacitors such as C31 and C32, the ripple components in corresponding output voltages E31 and E32 may be balanced in order to maximize ripple rejection in the differential output appearing across load element $R(L)$.

Having now completely described the circuitry forming preferred embodiments of the present invention, and also having set forth the operation of each of these embodiments, it will be apparent to those skilled in the pertinent art that the novel principles herein disclosed constitute a significant step forward in the increased utilization of capacitive pickoff members. Not only does the unique arrangement of rectifier elements provide the desired output from the pickoff with a sensitivity approaching the theoretical maximum and a very high degree of null stability, but it provides this with an absolute minimum of components for high reliability and relatively low manufacturing cost. Further, the circuit configuration readily adapts itself to present-day miniaturization techniques, and so is completely useable in all applications, including the most advanced. From the variations illustrated in the different embodiments disclosed herein, it will be apparent that the concepts underlying the invention may be embodied within different specific configurations, and that various modifications may be made to the specific circuitry set forth herein.

I claim:

1. A dual output circuit for producing a pair of direct voltage outputs from capacitive pickoff means and the like of the type excited by an alternating potential, said circuit comprising: a pair of symmetrical charge paths, each for connection with one of the lateral electrodes of said pickoff means; said charge paths each having a current flow when so connected that is representative of the charging of the connected lateral pickoff electrode; said charge paths each having means for rectifying the current flowing therein and means for generating a circuit output voltage representative of the rectified current; and a pair of symmetrical discharge paths, each for connection with one of the said lateral electrodes of said pickoff means; each of said discharge paths when so connected having a periodic current flow that is representative of the discharging of said pickoff means; and each of said charge path output voltage generating means producing a separate output having a known relation to the operation of the pickoff means.

2. The dual output circuit of claim 1, wherein each of said discharge paths includes a rectifying means connected in circuit in a manner inverse to that of the charge path rectifying means.

3. The dual output circuit of claim 1, wherein each of said charge path output generating means is an impedance element connected in series with the rectifying means in that path.

4. A dual output circuit for producing a pair of direct voltage outputs from capacitive pickoff means and the like of the type excited by an alternating potential, said circuit consisting of: a first series-connected resistor and diode for connection with one of the lateral electrodes of said pickoff means and providing a charge path therefore; a second series-connected resistor and diode for connection with another of the lateral electrodes of said pickoff means and providing a charge path therefore; each of said charge paths having a current flow when so connected that is representative of the charging of the lateral pickoff electrode connected thereto; each of said diodes acting to rectify the current flowing in its respective charge path, and each of said resistors developing an output voltage from the rectified current flowing therethrough; first and second filtering capacitors connected across said first and second resistors, respectively for smoothing the respective said output voltages; and a pair of diodes, each to be connected to each of said pickoff lateral electrodes with a polarity opposite from that of said charge path diodes, for providing discharge paths for said pickoff.

5. A differential output circuit for producing a differential voltage output directly from capacitive pickoff means and the like, said circuit comprising: a pair of symmetrical charge paths, each for connection with one of the lateral electrodes of said pickoff means; said charge paths each having a current flow when so connected that is representative of the charging of the lateral pickoff electrode connected thereto; said charge paths each having means for rectifying the current flowing therein and means for generating a circuit output voltage representative of the rectified current; differential circuit means coupled to each of said charge paths and receiving each of said output voltages; said circuit means producing a differential voltage output representative of the difference between the two said output voltages; and a pair of symmetrical discharge paths, each for connection with one of the said lateral electrodes of said pickoff means; each of said discharge paths when so connected having a periodic current flow that is representative of the discharging of said pickoff means; and each of said charge path output voltage generating means producing a separate output having a known relation to the operation of the pickoff means.

6. The differential output circuit of claim 5, wherein said differential circuit means comprises a series circuit including a resistance element coupled to each of said charge path output voltage generating means, said two output voltages opposing each other across said resistance element to produce a net voltage representative of their difference.

7. The differential output circuit of claim 6, wherein each of said discharge paths includes a rectifying means connected in circuit in a manner inverse to that of the charge path rectifying means.

8. The differential output circuit of claim 6, wherein each of said charge path output generating means is an impedance element connected in series with the rectifying means in that path.

References Cited

UNITED STATES PATENTS

| | | | |
|---|---|---|---|
| 2,567,373 | 9/1951 | Giacoletto et al. | 320—1 X |
| 2,968,031 | 1/1961 | Higa | 340—200 |
| 3,278,919 | 10/1966 | Fleming | 340—200 |

BERNARD KONICK, *Primary Examiner.*

J. F. BREIMAYER, *Assistant Examiner.*

U.S. Cl. X.R.

340—200; 324—111